United States Patent [19]

Sasai

[11] 4,079,212
[45] Mar. 14, 1978

[54] EXTENSION TELEPHONE SYSTEM

[75] Inventor: Minoru Sasai, Atsugi, Japan

[73] Assignee: Kanda Tsushin Kogyo Co., Ltd., Tokyo, Japan

[21] Appl. No.: 707,324

[22] Filed: Jul. 21, 1976

[30] Foreign Application Priority Data

| Jul. 23, 1975 | Japan | 50/89219 |
| Jul. 24, 1975 | Japan | 50/89673 |
| Jul. 25, 1975 | Japan | 50/90308 |
| Jul. 28, 1975 | Japan | 50/91152 |
| Jul. 28, 1975 | Japan | 50/91151 |
| Jul. 30, 1975 | Japan | 50/92083 |

[51] Int. Cl.$^2$ .......................... H04M 1/72
[52] U.S. Cl. .................................. 179/99
[58] Field of Search ............ 179/18 AD, 99, 17 B

[56] References Cited

U.S. PATENT DOCUMENTS

| 3,453,396 | 7/1969 | Lacey et al. | 179/99 |
| 3,514,544 | 5/1970 | Chambers, Jr. | 179/17 B |
| 3,927,278 | 12/1975 | Tsutsumi et al. | 179/99 |
| 4,024,353 | 5/1977 | Hijikata | 179/99 |

FOREIGN PATENT DOCUMENTS

| 17,169 | 7/1969 | Japan | 179/99 |
| 17,171 | 7/1969 | Japan | 179/99 |

Primary Examiner—Kathleen H. Claffy
Assistant Examiner—Randall P. Myers
Attorney, Agent, or Firm—Flynn & Frishauf

[57] ABSTRACT

An extension telephone system in which a main equipment and each of a plurality of key telephone sets are connected together through paired information conductors and paired control conductors. The key telephone system can perform various functions such as answering to an incoming call from a single central office line, holding of the single central office line, transferring the incoming call from the single central office line from one key telephone set to another key telephone set, keeping the central office line in secrecy, incoming call indication, line busy indication, line holding indication and individual paging with electronic sound or voice by variation and polarity reversal of a DC voltage applied between the paired control conductors by the main equipment and utilization of the information conductors for a central office line communication, internal communication and individual paging control.

23 Claims, 5 Drawing Figures

EXTENSION TELEPHONE SYSTEM

BACKGROUND OF THE INVENTION

This invention relates to an extension telephone system utilizing key telephone sets.

A variety of single central office line key telephone systems have been proposed. In any system, however, a cord for connecting a main equipment to each key telephone set requires more than 20 conductors. Such a conventional system requires conductors for each of various functions such as control office line talking, internal talking, lamp indication, private or exclusion talking control, individual paging etc. Accordingly, about 20 conductors are required to connect the main equipment to each key telephone set, offering disadvantages from the standpoint of a complicated engineering work, engineering work cost, system economy etc. This prevents a wide acceptance of a key telephone system for a single central office line which is directed to houses or dwellings, particularly apartment houses or shops. Even if a plan is made for wiring a house for a key telephone system installation during construction the house, difficulty is experienced due to many conductors involved. In order to decrease the number of conductors required, introduction of a time division system etc. may be considered as a countermeasure. In this case, however, such a system requires a complicated circuit and difficulty is also encountered in reducing such a system to practice from the standpoint of system economy.

It may be said that an extension key telephone system for houses or shops is not necessarily required to perform the same functions as those of a conventional key telephone system. Where about three key telephone sets are connected to the main equipment, if an individual paging or calling is possible, a general voice paging or calling function is not necessary. Even where central office talking and internal talking lines are shared in a telephone system, if a preference is given to a talking over a central office line, the telephone system suffers no great inconvenience.

SUMMARY OF THE INVENTION

It is, accordingly, the object of this invention to provide an extension key telephone system capable of performing a variety of functions by connecting a main equipment through four conductors to each key telephone set.

An extension telephone system according to this invention comprises a main equipment to be connected with a central office line, a plurality of key telephone sets and a single pair of talking conductors and a single pair of control conductors connecting the main equipment to each of the telephone sets. The main equipment is operative to vary a voltage between paired control connecting conductors in response to an incoming signal from the central office line, invert the polarity of a voltage between the paired control connecting conductors in response to the operation of a central office line key on one key telephone set, and send a call signal across the control connecting conductors in response to the incoming signal from the central office line or the operation of an inter-call key of the key telephone set. Each key telephone set comprises a first switching circuit means and an electrical-to-acoustic transducer means such as a loudspeaker connected in series between the paired control connecting conductors. The first switching circuit means are rendered ON by the variation of a voltage between the control connecting conductors to apply the call signal to the electrical-to-acoustic transducer to specify audibly the incoming call from the central office line. The key telephone set has privacy or exclusion talking providing circuit means for interrupting a telephone talking circuit of the key telephone set from the paired talking connecting conductors in response to the polarity inversion of a voltage between the control conductors when the line key of the key telephone set is not operated. The key telephone set further includes means for varying the electric potential of at least one of the paired talking conductors by the operation of an inter-call key, and a second switch means adapted to be selectively switched ON in response to the electric potential variation on the talking conductor caused by the operation of internal call key of another key telephone set and connected in series with the electric-to-acoustic transducer means. When the second switch means is turned ON, an individual call signal is applied to the electrical-to-acoustic transducer means to produce an audible tone.

The key telephone set can include means for visibly indicating arrival of an incoming signal from the central office line and central office line busy state by utilizing the conduction of the first switching circuit means and the polarity inversion of voltage between the control conductors. The main equipment can be provided with means for holding the central office line by the operation of an inter-call key on the key telephone set after voltage polarity inversion. During the holding of the central office line the main equipment causes the voltage between the control conductors to intermittently vary and intermittently turn ON the first switching circuit means in the key telephone sets to visually indicate the line holding at the key telephone sets.

DESCRIPTION OF THE PREFERRED EMBODIMENT

Figure 1:
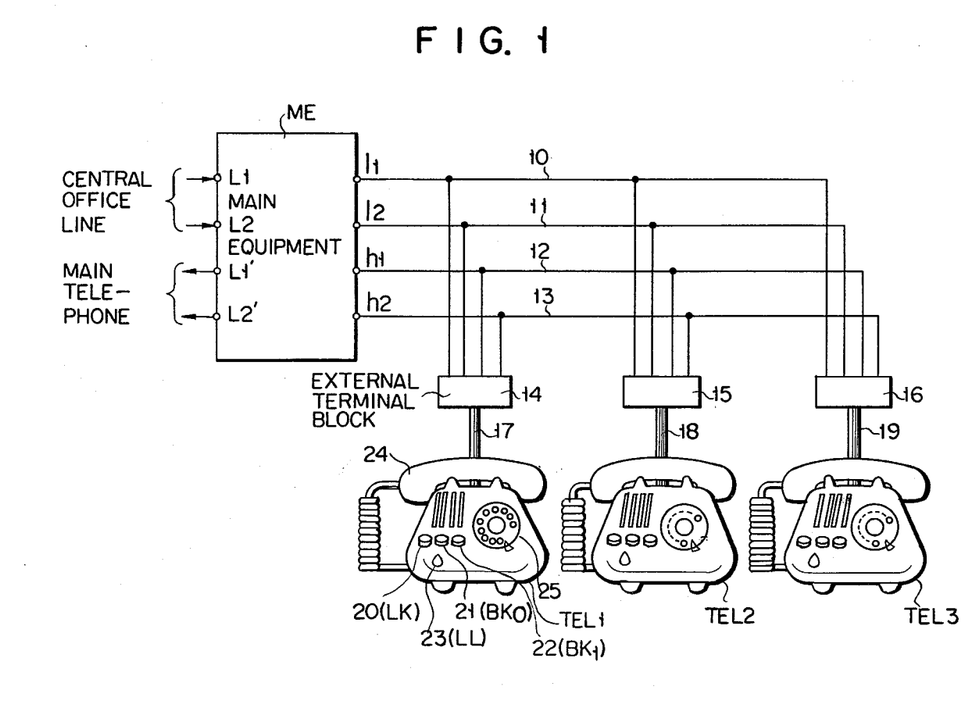
FIG. 1 is a block diagram of an extension telephone system according to this invention.

In an extension telephone system in FIG. 1 a central office line is connected to input terminals L1 and L2 of a main equipment ME which are connectable through switching means to output terminals $l_1$ and $l_2$. The main equipment ME has control terminals $h_1$ and $h_2$. The output terminals $l_1$ and $l_2$ and control terminals $h_1$ and $h_2$ of the main equipment ME are connected to key telephone sets TEL1, TEL2 and TEL3 through a cord including paired talking conductors 10 and 11 connected to the terminals $l_1$ and $l_2$, respectively, and paired control conductors 12 and 13 connected to the terminals $h_1$ and $h_2$, respectively. Reference numerals 14, 15 and 16 show external terminal blocks, respectively, disposed near to corresponding key telephone sets, and 17, 18 and 19 show four-conductor cords connecting the external terminal blocks 14, 15 and 16 to the key telephone sets TEL1, TEL2 and TEL3, respectively.

Each of the key telephone sets has, in addition to a rotary dial 25 and handset 24 having a transmitter and a receiver as an ordinary telephone set has, a line key 20 (LK) for answering an incoming call from the central office line, inter-call keys 21 ($BK_0$) and 22 ($BK_1$) for calling an internal party, and a visible indicator 23 (LL) for indicating a incoming call from the central office line, holding of the central office line and the line busy state. The line key 20 is of a locked type and inter-call keys 21, 22 are of a non-locked type. When either one of the intercall keys 21, 22 is depressed with the line key 20 in the depressed state, the line key 20 is released.

During a power failure or when the system is not in use, the central office line is connectable through switch means to a main telephone or an extension bell through terminals $L_1'$ and $L_2'$. Although the rotary dial type key telephone set is shown in FIG. 1, this invention can also be applied to a push button dial type telephone set.

With only the four conductors connecting the main equipment to each key telephone set, the telephone system according to this invention can perform various functions such as answering an incoming call from the central office line, holding of a central office line, transfer of a call from the central office line to any internal party, secret conversation over the central office line, incoming call indication, line busy indication, line holding indication, individual call or paging and so on.

The key telephone system according to this invention will be explained in more detail below by referring to FIGS. 2 to 5 which show circuit diagrams of the main equipment ME and the key telephone sets TEL1, TEL2 and TEL3, respectively.

Normal state

Figure 2:
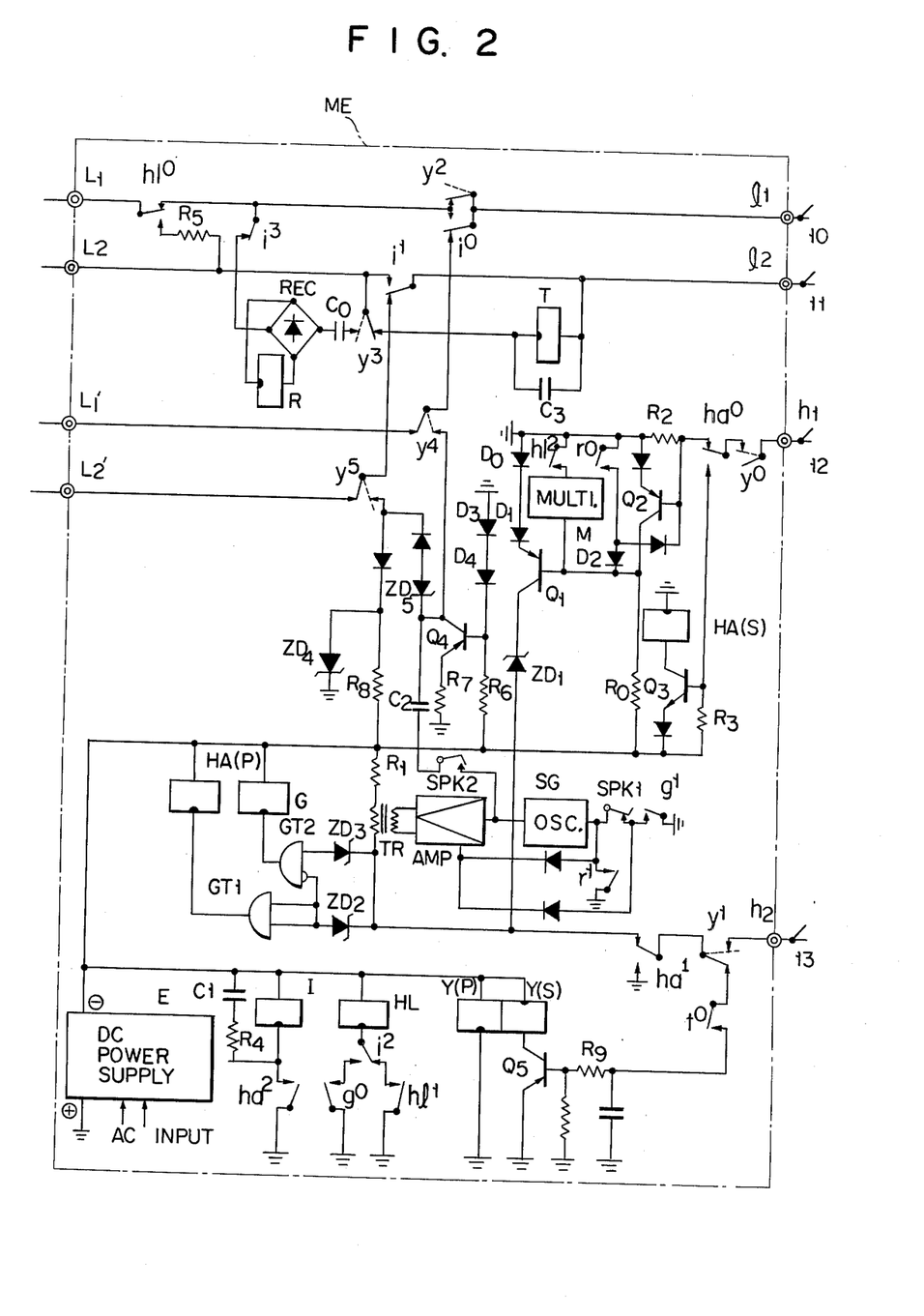
FIG. 2 is a circuit diagram of a main equipment in FIG. 1.

In the main equipment ME in FIG. 2 a DC power supply E connected to an AC line provides a negative DC voltage. While the power source E provides a supply voltage (about $-30$ volts), the primary winding of a relay Y connected across the power source E is energized to cause contacts $y^0$, $y^1$, $y^2$, $y^3$, $y^4$ and $y^5$ thereof to be switched as indicated by dotted lines. In the normal state the office line key and inter-call keys 21, 22 are not operated in any key telephone sets TEL1, TEL2, and TEL3 and in consequence a load is not connected between control terminals $h_1$ and $h_2$. In such a state a transistor $Q_1$ is always rendered ON by a circuit led from ground through diodes $D_0$ and $D_1$, the emitter of transistor $Q_1$, the base of transistor $Q_1$ and resistor $R_0$ to the DC power supply E. As a result, electric current flows through a zener diode $ZD_1$ via a circuit led from ground through diodes $D_0$ and $D_1$, transistor $Q_1$, zener diode $ZD_1$, transformer TR and resistor $R_1$ to the power source E, and in consequence an output voltage between the terminals $h_1$ and $h_2$ is maintained to a predetermined value substantially dependent upon the zener voltage (about 20V) of zener diode $ZD_1$.

Incoming call from central office line

Upon arrival of an incoming call from the central office line, a ringing current flows through an AC loop extending from the terminal $L_1$ through contact $hl^0$ of a relay HL, contact $i^3$ of a relay I, rectifier bridge REC, relay R, capacitor $C_0$, and contact $y^3$ of relay Y to terminal $L_2$, and thus the relay R is intermittently energized in synchronism with the ringing signal to cause a contact $r^0$ thereof to be intermittently operated. When the contact $r^0$ is so operated, a circuit is established from ground through the contact $r^0$, diode $D_2$ and resistor $R_0$ to the DC power supply E, causing the transistor $Q_1$ to be turned OFF. That is, the transistor $Q_1$ is intermittently turned OFF in synchronism with the ringing signal. With the transistor $Q_1$ in the OFF state the zener diode $ZD_1$ is released and a voltage between the terminals $h_1$ and $h_2$ is raised to the supply voltage (about 30V) of the power source E. When the relay R is energized, the contact $r^1$ is closed to enable a call signal generator SG and an amplifier AMP. The audio frequency electric signal from the call signal generator SG is fed through the amplifier AMP, transformer TR and control terminals $h_1$, $h_2$ to the control conductors 12 and 13.

Figure 3:
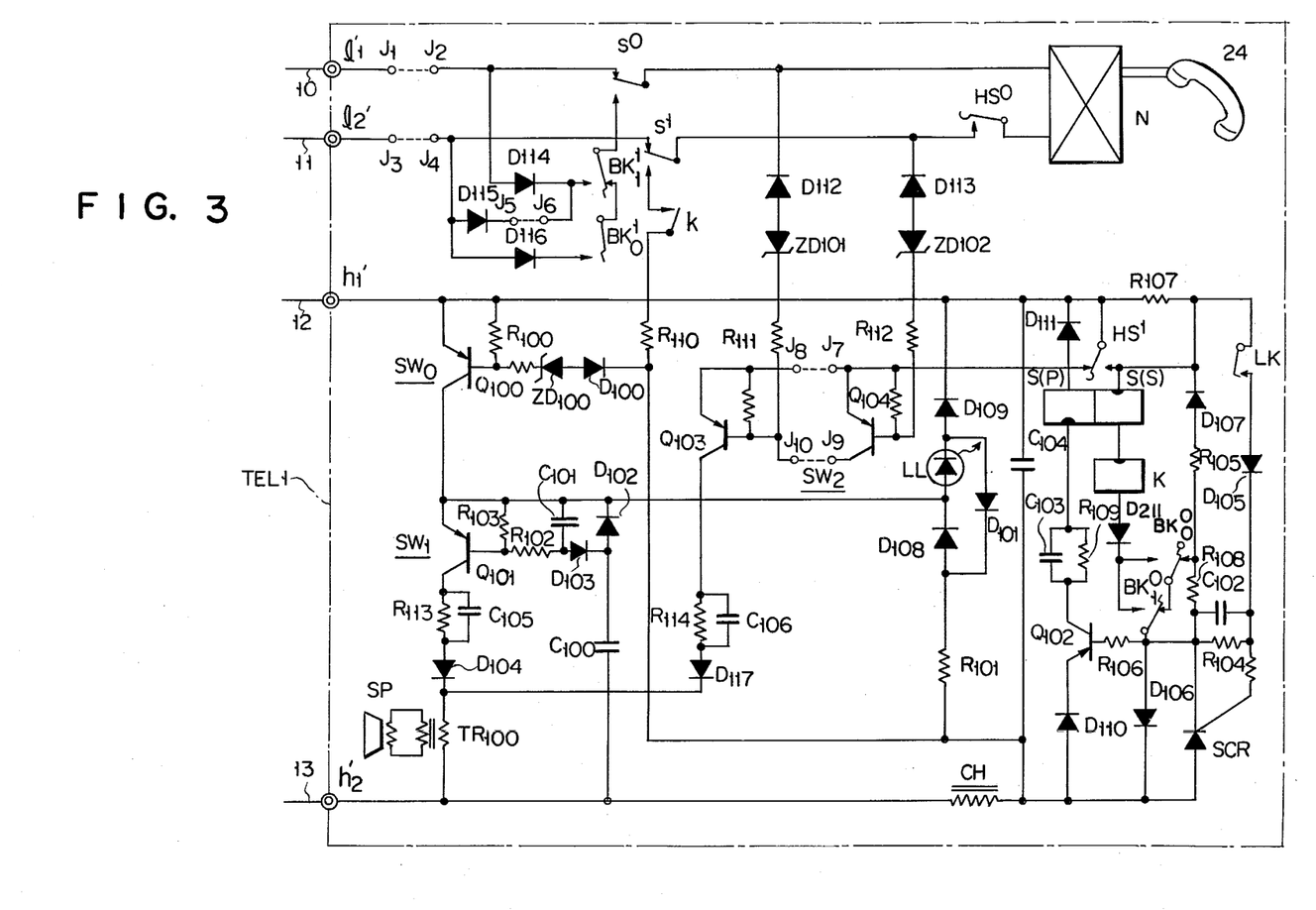
FIG. 3 is a circuit diagram of a key telephone set TEL1 in FIG. 1.
Figure 4:
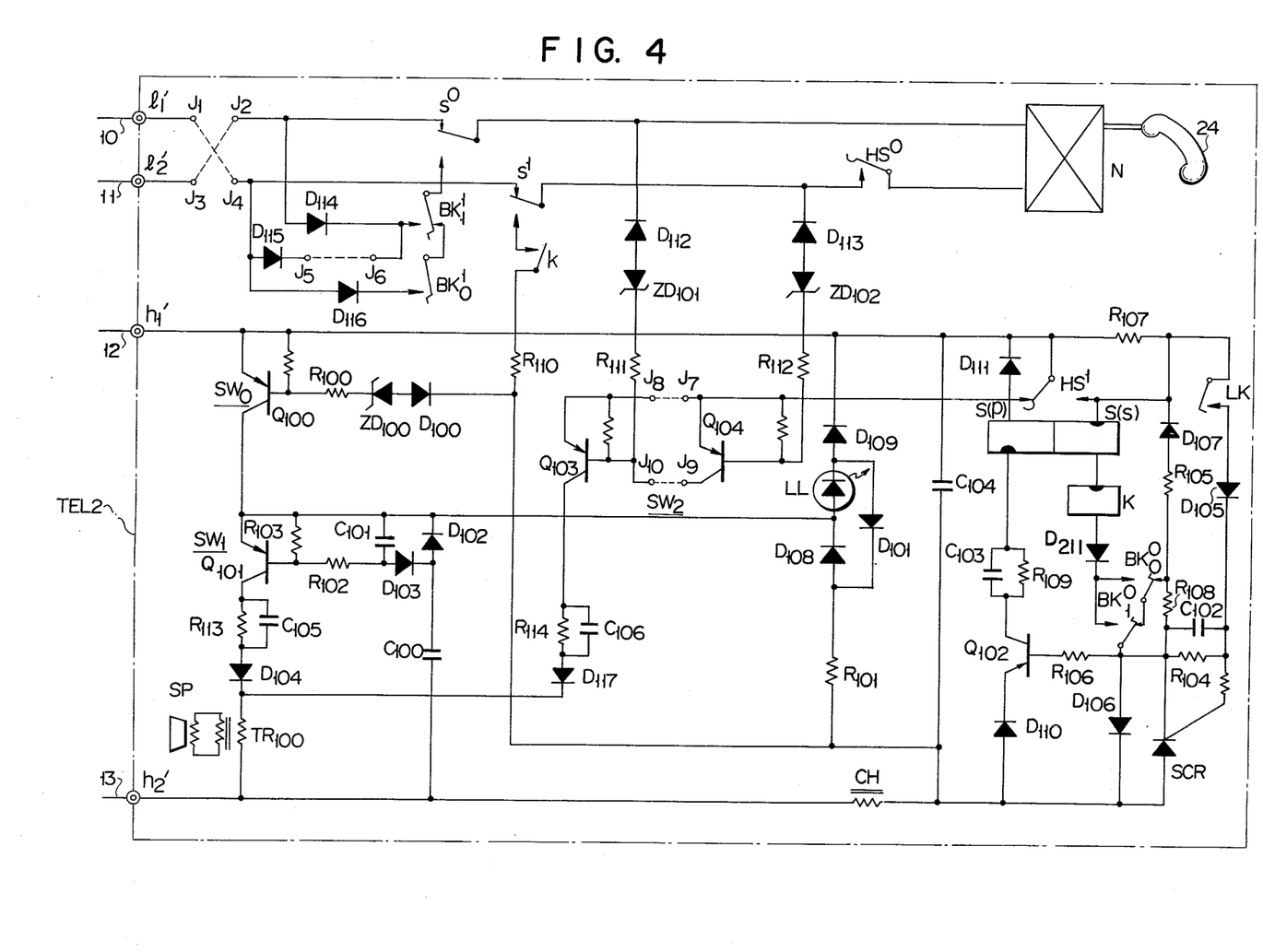
FIG. 4 is a circuit diagram of the key telephone set TEL2 in FIG. 1.
Figure 5:
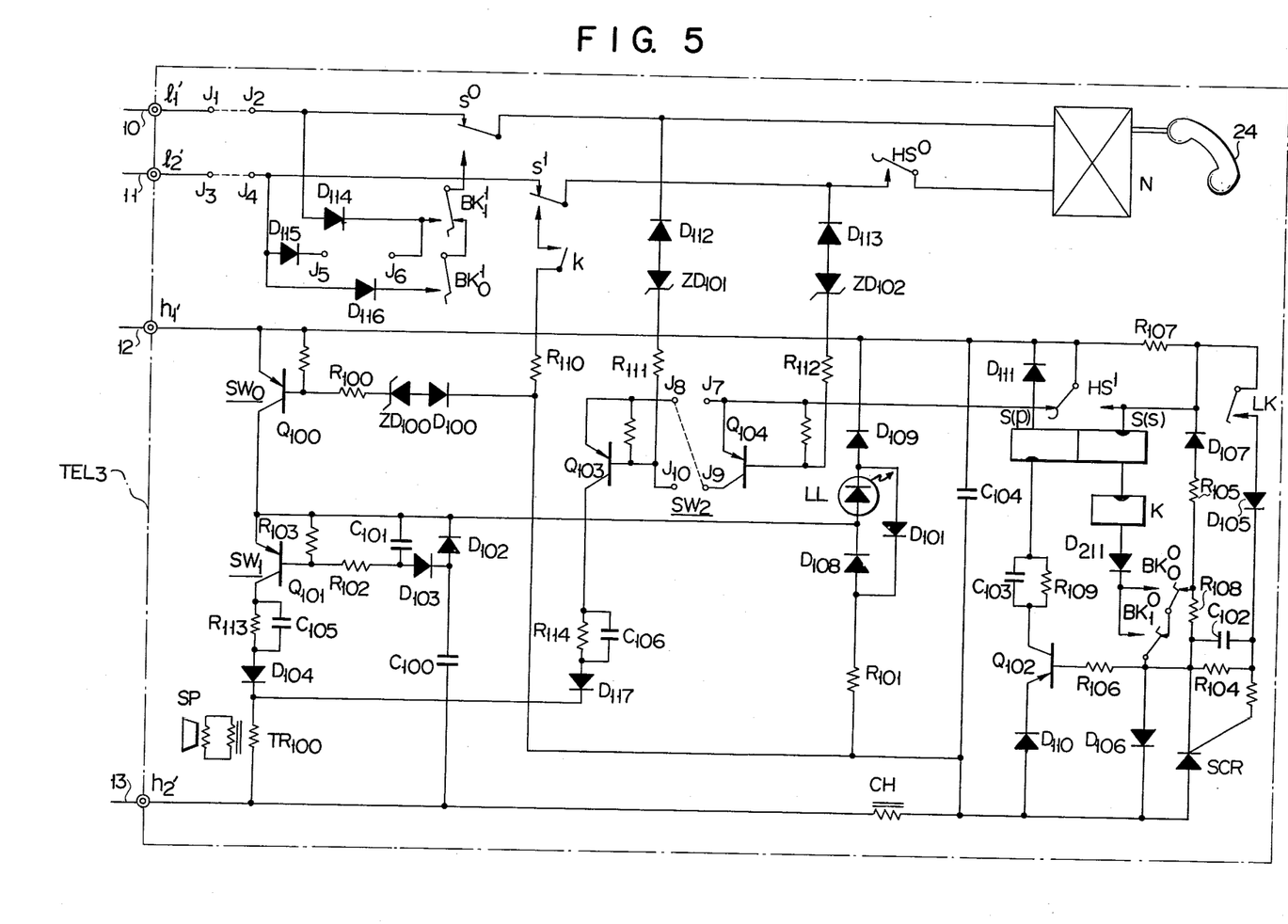
FIG. 5 is a circuit diagram of the key telephone set TEL3 in FIG. 1.

The raised voltage between the control conductors 12, 13 is greater than a zener voltage (about 20V) of a zener diode ZD100 of a switching circuit $SW_0$ in each of the key telephone sets of FIGS. 3, 4 and 5. When a voltage between the terminals $h_1$ and $h_2$ is raised, electric current flows through the zener diode ZD100 in a circuit led from ground through resistor $R_2$, contact $ha^0$ of a relay HA, contact $y^0$ of the relay Y, terminal $h_1$, control conductor 12, terminal $h_1'$ of the key telephone set, emitter of a transistor Q100, base of transistor Q100, resistor R100, zener diode ZD100, diode D100, choke coil CH, terminal $h_2'$, control conductor 13, terminal $h_2$, contact $y^1$ of the relay Y, contact $ha^1$ of the relay HA, transformer TR and resistor $R_1$ to the power supply E. As a result, the transistor Q100 of the switching circuit $SW_0$ is turned ON. Upon conduction of the transistor Q100 a circuit is established from the terminal $h_1$ through transistor Q100, light emitting diode LL, diode D101, resistor R101 and choke coil CH to terminal $h_2'$. As a result, the light emitting diode LL is lighted each time the relay R in the main equipment ME is energized, i.e., each time the voltage between the control conductors 12 and 13 is raised.

The audio frequency electrical signal on the control conductors 12 and 13 is applied through a capacitor C100 to a voltage doubler rectifying circuit including diodes D102 and D103, resistors R102, R103 and capacitor C101 and connected between the base and emitter of a transistor Q101 of a switch circuit $SW_1$ serially connected to the switching circuit $SW_0$. This causes the transistor Q101 to be turned ON. With the transistors Q100 and Q101 ON, a DC bias current flows through the transistors Q100 and Q101 to render a diode D104 conductive, and the audio frequency electric signal is applied through a transformer TR100 to a loudspeaker SP. That is, each time the relay R is energized, the loudspeaker SP sound. A resistor R113 is provided to permit the bias current of the diode D104 to have a suitable value and a capacitor C105 is provided to bypass the audio frequency electric signal.

As described above, upon arrival of an incoming call from the central office line, all the key telephone sets TEL1, TEL2 and TEL3 specify visibly and audibly the incoming call in synchronism with a ringing signal.

Answering to an incoming call from central office line

Upon arrival of an incoming call from the central line office an answer can be made to the call from the central office line through each key telephone set.

When an answer is made to the call from the central office line by means of, for example, the key telephone set TEL1, a subscriber lifts up the handset 24 and then depresses the line key 20. By so doing, hook switches $HS^0$, $HS^1$ are operated and a line key switch LK is closed. The closure of the line key switch LK establishes a loop led from ground through resistor $R_2$, contact $ha^0$, contact $y^0$, terminal $h_1$, control conductor 12, terminal $h_1'$, hook switch $HS^1$, line key switch LK, diode D105, resistor R104, diode D106, choke coil CH, terminal $h_2'$, control conductor 13, terminal $h_2$, contact $y^1$, contact $ha^1$, transformer TR and resistor $R_1$ to power source E to charge a capacitor C102 connected in parallel with the resistor R104. When a resistive value of the loop is small, a relatively great current flows through the loop. As a result, a voltage drop developed across the resistor $R_2$ renders the transistor $Q_2$ conductive and the transistor $Q_1$ nonconductive. When a voltage drop across the resistor $R_1$ which is developed by the loop current exceeds the zener voltage of a zener diode $ZD_2$, the primary winding of relay HA is energized through a gate $GT_1$. Though at this time a zener diode $ZD_3$ having a lower zener voltage than the zener diode $ZD_2$ is rendered conductive, a gate $GT_2$ is disabled by an inhibit input coupled to the anode of zener diode $ZD_2$ and hence relay G is not energized. By activation of relay HA the contacts $ha^0$, $ha^1$ and $ha^2$ thereof are operated and the polarity of a voltage between the control conductors 12 and 13 is inverted by the contacts $ha^0$ and $ha^1$. The capacitor C102 of the key telephone set discharges in response to the inversion of the voltage polarity to fire a thyristor SCR. As a result, a circuit is established from ground through contact $ha^1$, contact $y^1$, terminal $h_2$, control conductor 13, terminal $h_2'$, choke coil CH, thyristor SCR, movable contact of an inter-call key switch $BK_1$, break contact of $BK_1^0$, movable contact of an internal call key switch $BK_0^0$, break contact of $BK_0^0$, resistor R105, diode D107, hook switch $HS^1$, terminal $h_1'$, control conductor 12, terminal $h_1$, contact $y^0$, contact $ha^0$ and resistor $R_3$ to the power source E. A transistor $Q_3$ is rendered conductive by a voltage drop developed across the resistor $R_3$ and the relay HA is self-held by its secondary winding. During the voltage polarity inversion a loop is established from terminal $h_2'$ through choke coil CH, resistor R101, diode D108, light emitting diode LL and diode D109 to terminal $h_1'$. As a result, the light emitting diode LL is continuously lighted during the voltage polarity inversion, indicating that the central office line is busy. In this case, all the key telephone sets indicate that the line is busy.

Since, in the key telephone set TEL1, the thyristor SCR is rendered conductive, a transistor Q102 is rendered nonconductive and the primary winding of a relay S is not energized and thus contacts $s^0$ and $s^1$ of the relay S are not operated. Accordingly, a speaking or talking circuit N of the key telephone set TEL1 is connected through the hook switch $HS^0$ and contacts $s^0$ and $s^1$ to the terminals $l_1'$ and $l_2'$. On the other hand, since in the other telephone sets TEL2 and TEL3 the SCR is not rendered conductive, a loop is formed from terminal $h_2'$ through choke coil CH, diode D110, emitter of the transistor Q102, base of the transistor Q102, resistor R106, inter-call key switch $BK_1^0$, inter-call key switch $BK_0^0$, resistor R105, diode D107 and resistor R107 to terminal $h_1'$, causing the transistor Q102 to be rendered conductive. As a result, a loop is established from terminal $h_2'$ through choke coil CH, diode D110, transistor Q102, capacitor C103, primary winding of the relay S and diode D111 to terminal $h_1'$, causing the relay S to be operated. When the capacitor C103 is charged, the relay S holds its operation through a resistor R109 connected in parallel with the capacitor C103. Upon energization of the relay S, its contacts $s^0$ and $s^1$ are operated and the talking circuit N is forcibly disconnected from the terminals $l_1'$ and $l_2'$.

In the main equipment ME side, closure of the contact $ha^2$ by energization of the relay HA to energize the relay I. By the action of contacts $i^0$ and $i^1$ of the relay I the terminals $l_1$ and $l_2$ are connected to the central office line through the terminals $L_1$ and $L_2$, and in consequence only the talking circuit N of the key telephone set TEL1 answering to the incoming call is connected to the central office line. That is, the central office line is kept in secrecy.

Holding of central office line and transfer of an incoming call from central office line Explanation will now be made of the case where an incoming call from the central office line is transferred from the key telephone set TEL1 to the key telephone set TEL2.

When as mentioned above the telephone set TEL1 is connected to the central office line, if the subscriber depresses the inter-call key 21, the key switches $BK_0^0$ and $BK_0^1$ are operated. Upon the operation of the key 21 the line key 20 is restored and the key switch LK is opened. By the action of the switch $BK_0^0$ electric current flowing through the thyristor SCR is decreased due to insertion of the resistor R108, causing the transistor $Q_3$ in the main equipment to be rendered OFF. As a result, the relay HA is deenergized to restore the contacts $ha^0$, $ha^1$ and $ha^2$ and the voltage between the terminals $h_1$ and $h_2$ is returned to the original polarity with the terminal $h_1$ positive and the terminal $h_2$ negative. In consequence, the relays S of the other key telephone sets TEL2 and TEL3 are deenergized to release the exclusion or privacy circuit.

Since in the transfer side key telephone set TEL1 the internal call key 21 is operated, a loop is established from the terminal $h_1'$ through hook switch $HS^1$, secondary winding of the relay S, relay K, diode D211, make contact of the key switch $BK_0^0$, movable contact of the key switch $BK_0^0$, break contact of the key switch $BK_1^0$, movable contact of the key switch $BK_1^0$, diode D106 and choke coil CH to terminal $h_2'$, thereby energizing the relays S and K to operate the contacts $s^0$, $s^1$ and $k$. At this time, the transistor $Q_2$ of the main equipment ME is rendered conductive by electric current flowing through the loop between the terminals $h_1'$ and $h_2'$ and in consequence the transistor $Q_1$ is rendered nonconductive and the zener diode $ZD_1$ is released. Electric current flowing through the loop established by the operation of the inter-call key 21 is smaller than the electric current flowing through the loop established by the operation of the line key 20. This is because that the resistive value of the resistor R104 is selected to have a value smaller than a resultant resistive value of the secondary winding of the relay S and relay K. In consequence, only the zener diode $ZD_3$ with a zener voltage lower than that of the zener diode $ZD_2$ is rendered conductive by the voltage drop across the resistor $R_1$ which is developped by the relatively small current, causing the relay G to be energized through the gate $GT_2$.

Because of a serial circuit of a capacitor $C_1$ and resistor $R_4$ connected in parallel R with the relay I, the relay I is not immediately deenergized after the contact $ha^2$ of the relay HA is opened. In consequence, the energization of the relay G forms a circuit extending from ground through contact $g^0$, contact $i^2$ and relay HL to the power supply E, thereby energizing the relay HL.

Upon the restoration of the relay I the relay HL is self-held through the contact $hl^1$. Upon operation of the relay HL the central office line is held by the contact $hl^0$ and resistor $R_5$. The holding of the central office line is continued even after the intercall key 21 is released.

When the contact $hl^2$ is operated by the energization of the relay HL, a multivibrator M is operated. The base of transistor $Q_1$ is thus intermittently grounded at the oscillation frequency of the multivibrator M. Since with the inter-call key in the inoperative state no loop is formed between the terminals $h_1'$ and $h_2'$, the transistor $Q_2$ is not rendered ON. Because the base of transistor $Q_1$ is intermittently grounded, the transistor $Q_1$ is intermittently operated. As a result, as mentioned above, a voltage between the terminals $h_1$ and $h_2$ is intermittently raised and in all the key telephone sets the light emitting diode LL is flashed through the switch circuit $SW_0$ at a frequency dependent upon the frequency of the multivibrator M and the holding of central office line is visually indicated.

Since with the internal call key in the inoperative state a call signal is not present, the switch circuit $SW_1$ of the key telephone set is kept nonconductive. The switch circuit $SW_1$ is provided such that, during the line holding period in which talking is conducted between internal parties, the loudspeaker SP produces no click sound due to an intermittent voltage rise between the terminals $h_1'$ and $h_2'$ at the oscillation frequency of the multivibrator M. Accordingly, it will be evident that where such intermittent voltage elevation between the terminals $h_1'$ and $h_2'$, which specifies the holding of central office line, is not utilized during the central office line holding, the switch circuit $SW_1$ is not required.

With the central office line in the holding state the switches $BK_0^0$ and $BK_0^1$ are operated and the relay G in the main equipment ME is operated each time the inter-call key 21 is operated. On the other hand, a talking DC current is supplied to the talking circuit N in each key telephone set through contact voltage source including a zener diode $ZD_4$ and a resistor $R_8$ and a constant current source including a transistor $Q_4$, resistors $R_6$ and $R_7$ and diodes $D_3$ and $D_4$. By means of the constant voltage source and constant current source terminal $l_1$ is maintained to a potential of about $-1$ volt and the terminal $l_2$ to a potential of about $-5$ volt with respect to circuit ground. A potential difference between the terminals $l_1$ and $l_2$ is about 4 volts. In this state, a zener diode $ZD_5$ having a zener voltage higher than 4 volts is kept nonconductive. Zener diodes ZD101 and ZD102 in the key telephone sets are provided in order for transistors Q103 and Q104 in a switching circuit $SW_2$ not to be turned ON by the internal talking voltage applied between the terminals $l_1'$ and $l_2'$.

At the key telephone set TEL1 with jumper terminals $J_1$ and $J_2$, $J_3$ and $J_4$, $J_5$ and $J_6$, $J_7$ and $J_8$, and $J_9$ and $J_{10}$ respectively connected together, when the inter-call key 21 is depressed, the key switches $BK_0^0$ and $BK_0^1$ are operated and thus a circuit is formed from the terminal $h_1'$ through hook switch $HS^1$, secondary winding of the relay S, relay K, diode D111, make contact of the switch $BK_0^0$, movable contact of $BK_0^0$, break contact of the switch $BK_1^0$, movable contact of the switch $BK_1^0$, diode D106 and choke coil CH to terminal $h_2'$, energizing the relays S and K. As a result, a circuit is established from terminal $l_2'$ through jumper terminals $J_3$ and $J_4$, diode D 116, make contact of switch $BK_0^1$, movable contact of the switch $BK_0^1$, break contact of switch $BK_1^1$, movable contact of the switch $BK_1^1$, contact $s^0$, talking circuit N, hook switch $HS^0$, contact $s^1$, contact $k$, resistor R110 and choke coil CH to terminal $h_2'$ so that the potential on the terminal $l_2'$ is drawn to the potential on the terminal $h_2'$. As a result, in the key telephone set TEL2 with jumper terminals $J_1$ and $J_4$, $J_2$ and $J_3$, $J_5$ and $J_6$, $J_7$ and $J_8$, and $J_9$ and $J_{10}$ connected together respectively as indicated in FIG. 4 a circuit is formed from terminal $h_1'$ through hook switch $HS^1$, jumper terminals $J_7$ and $J_8$, emitter of transistor Q103, base of the transistor Q103, resistor R111, zener diode ZD101, diode D112, contact $s^0$ and jumper terminals $J_2$ and $J_3$ to terminal $l_2'$, causing the transistor Q103 to be rendered conductive. As a result, a DC current flows through a circuit extending from terminal $h_1'$ through hook switch $HS^1$, jumper terminals $J_7$ and $J_8$, transistor Q103, resistor R114, diode D117 and transformer TR100 to terminal $h_2'$, causing the diode D117 to be rendered conductive. A capacitor C106 connected in parallel with the resistor R114 is provided for bypassing alternating current.

In the main equipment ME, the relay G is energized when the inter-call key is depressed. Closure of the contact $g^1$ enables the signal generator SG and amplifier AMP to feed the call signal to the key telephone sets through the control conductors 12 and 13. In the key telephone set TEL2, the call signal is applied through the hook switch $HS^1$, transistor Q103, capacitor C106 and diode D117 to the transformer TR100 and in consequence the loudspeaker SP produces an audible tone to call the internal party.

In the key telephone set TEL3 with jumper terminals $J_1$ and $J_2$, $J_3$ and $J_4$, $J_8$ and $J_9$ connected together respectively as indicated in FIG. 5 the transistor Q104 whose base is connected through the diode D113, zener diode ZD102, resistor R112 to the terminal $l_2'$ can be rendered conductive while the transistor Q103 is kept nonconductive since the potential on the terminal $l_2'$ is drawn to the potential on the terminal $h_2'$. Accordingly, it will be understood that when the internal call key 21 is operated in the key telephone set TEL1, only the key telephone set TEL2 is called.

While, on the other hand, the internal call key 22 is operated in the key telephone set TEL1, switches $BK_1^0$ and $BK_1^1$ are operated. As a result, a circuit is formed from terminal $l_2'$ through jumper terminals $J_3$ and $J_4$, diode D115, jumper terminals $J_5$ and $J_6$, switch $BK_1^1$, contact $s^0$, talking circuit N, hook switch $HS^0$, contact $s^1$, contact $k$, resistor R110 and choke coil CH to terminal $h_2'$, and in consequence the potential on the terminal $l_2'$ is drawn to the potential on the terminal $h_2'$. At the same time, a circuit is formed from jumper terminals $J_1$ and $J_2$, diode D114, switch $BK_1^1$, contact $s^0$, talking circuit N, hook switch $HS^0$, contact $s^1$, contact $k$, resistor R110 and choke coil CH to terminal $h_2'$ and in consequence the potential on the terminal $l_1'$ is drawn to the potential on the terminal $h_2'$.

That is, when the internal call key 22 is depressed in the key telephone set TEL1, the potentials on the terminals $l_1'$ and $l_2'$ are drawn to the potential on the terminal $h_2'$. As a result, both the transistors Q103 and Q104 in the telephone set TEL3 are rendered conductive, the call signal from the main equipment ME is coupled to the loudspeaker SP in the key telephone set TEL3 through the transistors Q104 and Q103 to call the internal party.

With the key telephone set TEL2, on the other hand, both the transistors Q103 and Q104 can be rendered conductive and, however, when the transistor Q104 is turned ON, the transistor Q102 cannot be supplied with a base current and thus cannot be rendered conductive. In consequence, the call signal is not supplied to the loudspeaker SP in the key telephone set TEL2. That is, when the inter-call key 22 is operated in the key telephone set TEL1, a call can be given to only the key telephone set TEL3.

When the handset of the called key telephone set is lifted up, the hook switches $HS^0$ and $HS^1$ are operated and the talking circuit N of the callung key telephone set TEL1 is connected to that of the called key telephone set. A talking direct current is supplied through the above-mentioned constant voltage source and constant current source to permit a talking to be conducted between the internal parties.

When, like the control office line answer, the line key 20 is depressed by a called party in response to a transfer from a key telephone set, the polarity of voltage between the terminals $h_1$ and $h_2$ is reversed by energization of relay HA to operate the privacy or exclusion circuits in the other key telephone sets. At the same time, in the main equipment ME the relay I is energized and the relay HL is deenergized in response to the energization of the relay HA to release the holding of the central office line and couple the terminals $l_1$ and $l_2$ to the central office line. As a result, the called party can answer to the incoming call from the central office line.

Inter-call operation

The inter-call operation is substantially the same as the above-mentioned holding and transfer operations. However, the inter-call operation can be distinguished from the holding and transfer operations dependent upon whether or not a talking path to the central office line is established when an inter-call key is depressed, i.e., whether during the operation of the relay I the inter-call key is operated or during the inoperative state of the relay I the inter-call key is operated. This means that since in the mere inter-call operation the relay I is not operated the central office line is not held.

The above-mentioned line holding and transfer operations have been explained in connection with the inter-call from the key telephone set TEL1 to another key telephone set. A supplementary explanation will now be made of the inter-call from the key telephone sets TEL2 and TEL3.

When in the key telephone set TEL2 in FIG. 4 the inter-call key 21 is operated, the potential on the terminal $l_1'$ is drawn to the potential on the terminal $h_2'$ to call the key telephone set TEL1. When, on the other hand, the inter-call key 22 is operated, the potentials on the terminals $l_1'$ and $l_2'$ are drawn to the potential on the terminal $h_2'$ to call the key telephone set TEL3.

When in the key telephone set TEL3 the inter-call key 21 is operated, the potential on the terminal $l_2'$ is drawn into the potential on the terminal $h_2'$ to call the key telephone set TEL2. While, on the other hand, the inter-call key 22 is operated, the potential on the terminal $l_1'$ is drawn to the potential on the terminal $h_2'$ to call the key telephone set TEL1.

Individual voice paging

Although the above-mentioned inter-call or individual call operation is effected by an electronic sound from the signal generator SG, a voice paging is also possible. In order to effect the voice paging the switch $SPK_1$ in the main equipment ME is opened and the switch $SPK_2$ in the main equipment ME is closed. The switch $SPK_1$ may be ganged with the switch $SPK_2$. When, for example, the inter-call key 21 of the key telephone set TEL1 is depressed the relays S and K are operated like the electronic sound call operation. As a result, the talking direct current is fed to the handset 24 through a circuit extending from terminal $l_2'$ through jumper terminals $J_3$ and $J_4$, diode D116, switches $BK_0^1$ and $BK_1^1$, contact $s^0$, talking circuit N, hook switch $HS^0$, contact $s^1$, contact $k$, resistor R110 and choke coil CH to terminal $h_2'$. A vocal signal from the handset 24 is fed between the terminals $l_2'$ and $h_1'$ through an AC loop from terminal $l_2'$ through jumper terminals $J_3$ and $J_4$, diode D116, switches $BK_0^1$ and $BK_1^1$, contact $s^0$, talking circuit network N, contact $s^1$, contact $k$, resistor R110 and capacitor C103 to terminal $h_1'$. The vocal signal between the terminals $l_2'$ and $h_1'$ is applied through zener diode $ZD_5$, capacitor $C_2$ and switch $SPK_2$ to the amplifier AMP in the main equipment ME and then the amplified vocal signal is fed between the terminals $h_1$ and $h_2$. Accordingly, the voice paging from the key telephone set TEL1 can be given to the key telephone set TEL2.

Countermeasure against power failure

A countermeasure against a power failure is necessary when the DC voltage for operating the key telephone system is obtained from a commercial power source. When one key telephone set is busy, if a power failure occurs, the normally operating relay Y is deenergized and contacts $y^0$, $y^1$, $y^2$, $y^3$, $y^4$ and $y^5$ are rapidly restored. In consequence, a talking between the central office line and, for example, the key telephone set TEL1 can be conducted without disconnecting the line loop, due to the rapid restoration of the contacts $y^2$ and $y^3$ and slow restoration of the relay I by means of resistor $R_4$ and capacitor $C_1$ connected in parallel with relay I. That is, during a power failure the line loop is kept by a circuit extending from terminal $L_1$, contact $hl^0$, contact $y^2$, terminal $l_1$ conductor 10, terminal $l_1'$, jumper terminals $J_1$ and $J_2$, contact $s^0$, talking circuit N, hook switch $HS^0$, contact $s^1$, jumper terminals $J_4$ and $J_3$, terminal $l_2'$, conductor 11, terminal $l_2$, capacitor $C_3$ and contact $y_3$ to terminal $L_2$. A relay T connected in parallel with the capacitor $C_3$ is operated by a DC power source at the central office. When electric power is restored during line talking to permit the DC power supply E to be operated, a circuit is established from ground, through emitter of transistor $Q_5$, base of transistor $Q_5$, resistor $R_9$, contact $t^0$ of relay T, contact $y^1$, contact $ha^1$, transformer TR and resistor $R_1$ to DC power supply E, permitting the transistor $Q_5$ to be rendered conductive. As a result, electric current flows through the primary and secondary windings of the relay Y which are wound in directions opposite to each other and thus the relay Y cannot be operated. That is, even if a power failure is restored during line talking, the same state as during the power failure is kept. When at the completion of talking the handset is lowered, the relay T is recovered to permit the contact $t^0$ to be opened. As a result, the transistor $Q_5$ is rendered nonconductive and the relay Y is again operated. When an incoming signal arrives during a power failure from the central office line, a circuit is established from terminal $L_1$ through contact $hl^0$, contact $y^2$, contact $t^0$, contact $y^4$, terminal $L_1'$, main telephone set or extension bell, terminal $L_2'$, contact $y^5$, contact $i^1$, capacitor $C_3$ and contact $y^3$ to terminal $L_2$, and thus the main telephone set or extension bell rings in response to an incoming call from the central office line.

What is claimed is:

1. An extension telephone system comprising:
   a main equipment adapted to be connected to a central office line;
   a plurality of key telephone sets, each having a handset, a talking circuit coupled to said handset, a line key, a line key switch coupled to said line key, a plurality of inter-call keys and inter-call key switches coupled to said inter-call keys;
   a single pair of talking conductors and a single pair of control conductors connecting said main equipment to each key telephone set, said pair of talking conductors being connectable to said central office line and to said talking circuit, and said control conductors being coupled to said line key switch and said inter-call key switches;
   said main equipment including:
   first means for applying a DC voltage between the conductors of said pair of control conductors;
   second means coupled to said control conductors for varying the magnitude of the DC voltage applied between said paired control conductors in response to a ringing signal from said central office line;
   third means coupled to said control conductors for inverting the polarity of the voltage between said paired control conductors in response to a loop being formed between said paired control conductors through a line key switch when said line key at one of the key telephone sets is depressed;
   fourth means coupled to said control conductors for sending an audio-frequency electric signal to said paired control conductors in response to the ringing signal from said central office line or to a loop formed between said control conductors through an inter-call key switch when an inter-call key of one of said key telephone sets is depressed; and
   said key telephone sets each further comprising:
   first switching means connected between said paired control conductors and arranged to be rendered conductive in response to the voltage variation appearing across said paired control conductors;
   an electrical-to-acoustic transducer means connected between said paired control conductors in series with said first switching means for producing an audible tone in response to the audio-frequency electric signal when said first switching means is conductive;
   means responsive to the polarity inversion of the DC voltage between said paired control conductors which is caused by the operation of said line key of another key telephone set for disconnecting said talking circuit from said paired talking conductors;
   means for coupling at least one of said paired talking conductors to one of said control conductors through an inter-call key switch when one of said inter-call keys is depressed to thereby vary the potential of at least one of said paired talking conductors; and
   second switching means selectively connected across said paired talking conductors and to said paired control conductors and in a series path with said electrical-to-acoustic transducer means, said second switching means being arranged to be selectively rendered conductive in response to the variation of the electric potential on said talking conductors which is caused by the operation of one of said inter-call keys of another key telephone set.

2. A telephone system according to claim 1, in which each of said key telephone sets further includes a visible indicator means connected across said paired control conductors and in a series path with said first switching means and arranged to be lighted when said first switching means is conductive.

3. A telephone system according to claim 1, in which each of said key telephone sets further includes a visible indication means connected between said paired control conductors and arranged to be lighted during the polarity inversion of the voltage between said control conductors.

4. A telephone system according to claim 1, in which said main equipment further includes means for holding said central office line in response to the operation of an intercall key following the operation of said line key at one of said key telephone sets.

5. A telephone system according to claim 1, in which said main equipment further includes means for holding said central office line in response to the operation of an inter-call key following the operation of said line key at one of said key telephone sets and means for causing said second means to vary the voltage between said paired control conductors intermittently during the central office line holding time.

6. A telephone system according to claim 1, in which said second switching circuit means includes a pair of transistors whose bases are coupled to said paired talking conductors, respectively.

7. A telephone system according to claim 1, in which said second switching means is connected through a hook switch between the paired control conductors when said associated key telephone set is in the on-hook condition.

8. A telephone system according to claim 1, in which said first switching means includes a switch circuit which is rendered conductive in response to the variation of voltage between said paired control conductors and a further switch circuit which is rendered conductive in response to the audio-frequency electric signal.

9. A telephone system according to claim 1, in which said fourth means includes a signal generator for producing an audio-frequency electric signal when the ringing signal arrives from said central office line or an inter-call key is operated at one of said key telephone sets.

10. A telephone system according to claim 1, in which, when the inter-call key of a key telephone set is operated, the audio-frequency electric signal supplied to said paired control conductor is a voice signal from a transmitter in said handset which is supplied from one of said key telephone sets through one of said control conductors and one of said talking conductors to said main equipment.

11. A telephone system according to claim 1, in which said inter-call keys are of a non-lock type and said line key is of a lock type.

12. A telephone system according to claim 1, in which said first means includes a transistor and a zener diode coupled in series, the series combination of said transistor and zener diode being coupled between said paired control conductors.

13. An extension telephone system according to claim 1 wherein said main equipment is connected to a single central office line.

14. An extension telephone system comprising: a main equipment connected to a central office line; a plurality of key telephone sets, each having a handset, a talking circuit coupled to said handset, a line key and a plurality of inter-call keys; and connecting means connecting said main equipment to each of said key telephone sets and including a single pair of control conductors and a single pair of talking conductors, said pair of talking conductors being connectable to said central office line and to said talking circuit, and said control conductors being coupled to said line key and said inter-call keys;

said main equipment including means for normally applying a substantially constant DC voltage between said paired control conductors, and means to elevate the DC voltage between said control conductors and apply an audio-frequency electrical signal between said control conductors in response to an incoming signal from said central office line; and each of said key telephone sets comprising:
 a pair of terminals adapted to be connected to said paired control conductors;
 first switching means connected between said terminals and which is rendered conductive in response to the elevated DC voltage between said paired control conductors; and
 an electrical-to-acoustic transducer means connected between said terminals in series with said first switching means for producing an audible tone in response to application of the audio-frequency electrical signal thereto when said first switching means is conductive.

15. A telephone system according to claim 14, in which each of said key telephone sets further comprises a second switching means connected between said terminals in series with said first switching means and being rendered conductive in response to application of the audio-frequency electrical signal.

16. An extension telephone system according to claim 14 wherein said main equipment is connected to a single central office line.

17. An extension telephone system comprising:
a main equipment connected to a central office line;
a plurality of key telephone sets, each having a handset, a talking circuit coupled to said handset, a line key and a plurality of inter-call keys; and
connecting means connecting said main equipment to each of said key telephone sets and including a single pair of control conductors and a single pair of talking conductors, said pair of talking conductors being connectable to said central office line and to said talking circuit, and said control conductors being coupled to said line key and said inter-call keys;

said main equipment including means for normally applying a substantially constant DC voltage between said paired control conductors to elevate the DC voltage between said paired control conductors in response to an incoming call from said central office line and to invert the polarity of the DC voltage between said paired control conductors when one key telephone set answers the incoming call from said central office line; and each of said key telephone sets comprising:
 a pair of terminals adapted to be connected to said control conductors;
 switching means connected between said terminals and which is rendered conductive in response to the elevated DC voltage between said control conductors; and
 indicator circuit means connected between said terminals and to said first switching means for visually indicating that an incoming call arrives from said central office line and that said central office line is busy.

18. An extension telephone system according to claim 13 wherein said main equipment is connected to a single central office line.

19. An extension telephone system comprising:
a main equipment connected to a central office line;
a plurality of key telephone sets each having a talking circuit network, a line key, a plurality of inter-call keys and a handset coupled to said talking circuit network; and
a single pair of information conductors and a single pair of control conductors connecting said main equipment to each of said key telephone sets, said pair of information conductors being connectable to said central office line and to said talking circuit network, and said control conductors being coupled to said line key and said inter-call keys;

means for coupling each talking circuit network to said central office line through said information conductors when the associated line key is operated after lifting up of the associated handset; and said main equipment comprising means for applying a DC voltage between said paired control conductors and for inverting the polarity of the DC voltage applied between said paired control conductors in response to the operation of each line key;

each of said key telephone sets comprising:
 a first pair of terminals adapted to be connected to said control conductors;
 a second pair of terminals adapted to be connected to said information conductors;
 means for forming a loop between said first pair of terminals in response to the operation of the associated line key; and
 relay circuit means connected between said first pair of terminals and having relay contact means which are arranged to disconnect the associated talking circuit from said second pair of terminals when said relay circuit means is operated in response to the polarity-inverted DC voltage appearing between said paired control conductors when the associated loop is formed in another of said telephone sets.

20. An extension telephone system according to claim 19 wherein said main equipment is connected to a single central office line.

21. In an extension telephone system comprising:
a main equipment connected to a central office line;
three key telephone sets, each having a handset, a talking circuit coupled to said handset, a hook switch, a line key and two inter-call keys; and
a single pair of information conductors and a single pair of control conductors connecting each of said key telephone sets of said main equipment, said pair of information conductors being connectable to said central office line and to said talking circuit, and said control conductors being coupled to said line key and said inter-call keys;

said main equipment including means for applying an internal-talking constant current signal to said information conductors and means for feeding a call signal to said control conductors when the inter-call key of one of said key telephone sets is operated;

each of said key telephone sets comprising:
- a first pair of terminals adapted to be coupled to said information conductors;
- a second pair of terminals adapted to be coupled to said control conductors;
- means for varying the electrical potential of at least one terminal of said first pair of terminals in response to the operation of one of the associated inter-call keys; and
- a switching circuit means and an electrical-to-acoustic transducer means connectable in series across said second pair of terminals through an associated hook switch when the associated telephone set is in the on-hook condition, said switching circuit means including a pair of transistors the bases of which are respectively coupled to the terminals of said first pair of terminals and being selectively activated to apply a call signal to said electrical-to-acoustic transducer means in response to the electrical potential variation at said at least one terminal of said first pair of terminals which is caused by the operation of one inter-call key of another key telephone set.

22. A telephone system according to claim 21, in which each of said key telephone sets comprises zener diodes respectively coupled between the bases of said paired transistors and said first pair of terminals.

23. An extension telephone system according to claim 21 wherein said main equipment is connected to a single central office line.

* * * * *

UNITED STATES PATENT AND TRADEMARK OFFICE
CERTIFICATE OF CORRECTION

PATENT NO. : 4,079,212
DATED : March 14, 1978
INVENTOR(S) : Minoru SASAI

It is certified that error appears in the above-identified patent and that said Letters Patent are hereby corrected as shown below:

On the initial page of the patent, next to the heading "Filed:" change "Jul." to --July--;

Column 14 (claim 18), line 11, change "13" to --17--.

Signed and Sealed this

Eighth Day of August 1978

[SEAL]

Attest:

RUTH C. MASON
*Attesting Officer*

DONALD W. BANNER
*Commissioner of Patents and Trademarks*